United States Patent Office 3,296,328
Patented Jan. 3, 1967

3,296,328
PROCESS FOR PREPARING OLEFINIC COMPOUNDS
Piero Pino and Gian Paolo Lorenzi, Pisa, Italy, assignors to Montecatini Societa Generale per l'Industria Mineraria e Chimica, Milan, Italy
No Drawing. Filed Mar. 11, 1963, Ser. No. 264,054
Claims priority, application Italy, Mar. 15, 1962, 5,138/62
8 Claims. (Cl. 260—681)

Our invention relates to a process for preparing olefinic compounds.

An object of our invention is a simple and economical method for obtaining in a single step olefinic compounds from alkenyl ethers.

A number of processes are reported in the literature for the preparation of olefinic compounds (olefins). Most of these processes, however, require the use of intermediate compounds, e.g. trialkylamines, oxides of trialkylamines, xanthogenates, etc., which may prove tedious and gives lower over-all yields. Moreover, in the final step of preparing olefinic compounds, very high temperatures must be utilized, which temperatures may alter the remainder of the molecule.

We have found that olefinic compounds may be readily prepared in a single step with high yields, from alkenyl ether having a characteristic group

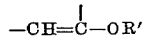

wherein R' is an alkyl radical of any length.

More particularly, we have found that by reacting an alkenyl ether of the above-mentioned type with an aluminum compound of type $R_2AlR^3$ (wherein R represents an alkyl radical and $R^3$ means H or a radical of the type:

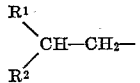

[wherein $R^1$ and $R^2$, which may be alike or differ, are hydrogen or alkyl groups]) splitting of the carbon-oxygen bond occurs. When $R^3$ is H the reaction is

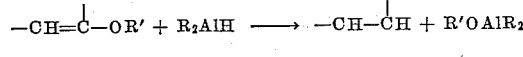
(1)

when $R^3$ is an alkyl group as described above, the following reaction takes place:

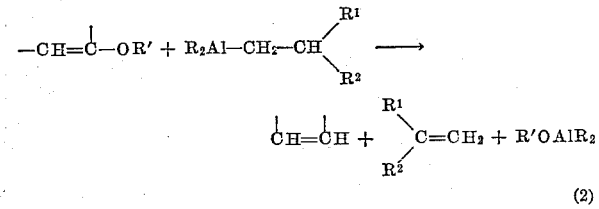
(2)

The alkenyl ethers which are employed as starting materials in reactions (1) and (2) above may be readily and economically obtained respectively by simple pyrolysis, in acidic medium, of the corresponding acetals or ketals according to reactions reported in the literature (M. Farina, Peraldo, and Bressan: Chimica & Industria, 42, 967 (1960); and D. Killian, O. F. Hennion, and Nieuwland: J. Am. Chem. Soc. 57, 544 (1935)).

The fact that reactions (1) and (2) occur is surprising since it is known that compounds of $R_2AlR^3$ type (when R=alkyl and $R^3$=H) add readily to the unsaturated bonds according to the reaction:

$$R'-CH=CH_2 + R_2AlH \longrightarrow R'-CH_2-CH_2-AlR_2 \quad (3)$$

(wherein R' and R are alkyl groups).

We have found, however, that addition compounds of the aluminum dialkyl monohydride to the double bond of starting compounds are not present, even in traces, in the reaction products. This phenomenon occurs even when the alkenyl groups $R'-CH=CH-$ are vinyl groups $CH_2=CH-$ which, being free of steric hindrance, should prove to be more readily attackable.

Reaction (1) may occur also at room temperature, whereas reaction (2) is generally carried out at temperatures not above 130° C. This is advantageous in comparison to previously known processes wherein much higher temperatures are employed, especially when olefinic compounds, unstable at high temperatures, are to be prepared.

Since the freshly formed olefinic compounds may react with the aluminum dialkyl monohydrides it is preferable to add the compound $R_2AlR^3$, when $R^3$=H, in small portions to the alkenyl ether to be decomposed and to remove, as formed, the olefinic compound from the reaction vessel. This may be done, for instance, by carrying out the reaction in a hydrocarbon solvent having a boiling point intermediate that of the olefinic compound produced and that of the alkenyl ether to be decomposed and operating at the boiling temperature of the solvent.

The structure of alkenyl ethers, employed according to our invention, does not exert a noticeable influence upon the reaction course provided that the double bond is adjacent to the oxygen atom. Thus when starting with vinyl ethers, ethylene is obtained with very high yields; from propenyl-ethyl-ether, propylene is obtained and from pentenyl-ethyl-ether, pentene-1.

$CH_2=CH-O-R_2 + (i-C_4H_9)_2AlH \longrightarrow$
$\qquad CH_2=CH_2 + (i-C_4H_9)_2AlOR_2$
$CH_3-CH=CH-O-C_2H_5 + (i-C_4H_9)_2AlH \longrightarrow$
$\qquad CH_3-CH=CH_2 + (i-C_4H_9)_2AlOC_2H_5$
$CH_3-CH_2-CH_2-CH=CH-O-C_2H_5 + (i-C_4H_9)_2AlH \longrightarrow$
$\qquad CH_3-CH_2-CH_2-CH=CH_2 + (i-C_4H_9)_2AlOC_2H_5$ Alkenyl ethers wherein the double bond is included in a ring are also applicable. Illustrations of such alkenyl ethers are the alkoxycyclohexenes of type

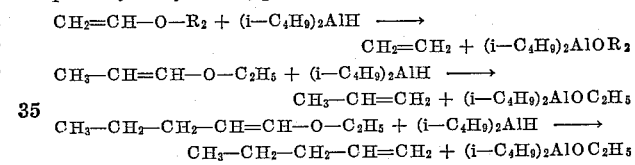

Our invention, therefore, provides a convenient method for removing an oxygen atom from such compounds while surprisingly leaving unchanged the double bond.

While aluminum di-isobutyl monohydride has been primarily used in the specific examples as the organometallic compound, this is because of ready availability, and any other aluminum dialkyl monohydride, such as aluminum diethyl monohydride, aluminum di-isoamyl monohydride, etc. may be substituted therefor.

When the olefinic compound cannot be immediately removed from the reaction vessel, instead of employing an aluminum-organic compound of type $R_2AlR^3$ (wherein $R^3$=H), a compound wherein $R^3$=R, i.e. an aluminum trialkyl, preferably aluminum tri-isobutyl, is employed, which reacts promptly with the alkenyl ethers under formation of isobutylene according to scheme (4), however does not reduce the occurring olefins.

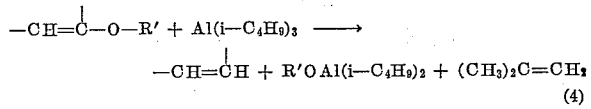
(4)

The following examples illustrate without restricting in any way this invention which is generally applicable to alkenyl ethers containing the group

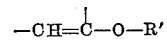

independently of the structure of alkyl group R'.

Example 1

In a small flask previously flushed with nitrogen and cooled to 0° C., 2.49 (0.0249 mole) vinyl isobutyl ether, $n_D^{25}=1.3941$, and 7.0 cc. Al(i-$C_4H_9$)$_3$ previously purified by distillation under reduced pressure are introduced in a nitrogen current. The vessel and reactants are then weighed, attached to a Liebig cooler (condenser) already connected with a collecting test tube immersed into a Dewar flask containing liquid air or, through this, to a mercury pressure reducer and to a bottle containing pure nitrogen. While periodically agitating to obtain the perfect admixture of the reactants, the reaction vessel is heated by an oil bath up to 120° C. and kept at this temperature for 1½ hours. The small flask is weighed again, after cooling to room temperature. The weight loss observed, which corresponds approximately to the weight of the gases evolved during the reaction, is 1.9 g. Chromatographic analysis of the gaseous products condensed in the collecting tube proves that they are isobutylene and ethylene in molar ratio 1:1. Accordingly the moles of ethylene obtained are 0.022 and the yield, calculated on the basis of the employed vinyl isobutyl ether, is about 88%. The identity of collected gases is controlled through I.R. spectrography.

Example 2

5.46 g. (0.0275 mole) aluminum tri-isobutyl are decomposed by heating at 120–130° C. under a reduced pressure of 20 mm. Hg. in a 25 cc. flask with a side arm and with a reflux condenser. The length of heating is 2½ hours. The yield of aluminum di-isobutyl monohydride, calculated on the basis of the volume of the isobutylene evolved during the reaction, is about 95%. After cooling at room temperature, 2.37 g. (0.0237 mole) isobutyl vinyl ether, $n_D^{20}=1.3966$, previously distilled over metallic sodium, are injected with hypodermic syringe through the side arm. The introduction of vinyl ether causes a vigorous reaction and development of large amounts of gas. When the gas formation has seemingly ceased, the small flask is heated with an oil bath at 120° C., then is kept at this temperature for 1½ hours. The gas evolved is condensed in a test tube cooled in liquid air. After the reaction has ceased, the gas is collected on water in a gasometer, where its volume is measured, then analyzed by chromatography. 0.007 mole practically pure ethylene are obtained with a 29% yield.

Example 3

A solution of 1.9 g. (0.0125 mole) 2-ethylhexyl vinyl ether, $n_D^{20}=1.4278$, purified immediately before use by distillation over sodium, in 10 cc. anhydrous iso-octane, is brought to boiling, under anhydrous nitrogen atmosphere, in a small flask of 25 cc. provided with dropping funnel and reflux condenser. The solution is stirred during heating by a magnetic stirrer. While the solution is kept under reflux and stirred, 4.6 cc. of aluminum diisobutyl monohydride, prepared from 5.34 g. (0.0269 mole) aluminum tri-isobutyl as described in Example 2, are added dropwise. The monohydride addition lasts one hour, at the end of which the reaction mixture is allowed to reflux for one additional hour to complete the reaction. The gaseous products, which are collected in a test tube cooled with liquid air, prove, by chromatographic analysis, to be almost exclusively ethylene (0.0085 mole). The yield is 68%.

Example 4

The equipment employed consists of a 25 cc. flask provided with dropping funnel and small rectification column whereto a reflux condenser, having a tap for the distillate collection, is superimposed. The condenser is connected through a mercury pressure reducer to a water gasometer.

Into the small flask is introduced under nitrogen atmosphere, a solution of 2.20 g. (0.025 mole) ethyl propenyl ether, $n_D^{20}=1.3965$, B.P. 69–75° C., prepared from propionaldehyde diethyl acetal by pyrolysis in the presence of sulfamylic acid and purified by distillation over sodium, in 10 cc. anhydrous iso-octane. The solution is brought, with an oil bath, up to 50° C., then dropwise addition, under magnetic stirring, of aluminum di-isobutyl monohydride prepared by decomposition, at 120–130° C., of 8.40 g. (0.042 mole) of aluminum tri-isobutyl, is started. During the monohydride addition, the temperature is allowed to increase gradually so that at the end of the addition, which lasts one hour, it is about 100° C. From the top of the rectification column, 1–2 cc. of distillate are collected, made up for a good part of unreacted alkenyl ether which, after having cooled the reaction vessel to 50° C., are introduced again in the small flask through the dropping funnel. The reaction is completed while keeping the mixture under stirring at 50° C. for one hour and subsequently heating it up to solvent boiling.

By chromatographic analysis, the gas collected in the gasometer proves to contain 0.011 mole propylene (yield 44%).

Example 5

10 cc. anhydrous iso-octane and 2.3 g. (0.0202 mole) pentenyl ethyl ether, $n_D^{20}=1.4138$, B.P. 121.5–124.5° C., are placed in a small flask of 25 cc. provided with dropping funnel and rectification column whereto a cooler is superimposed. The alkenyl ether was prepared by pyrolysis, in the presence of sulfamylic acid, of diethyl acetal of the normal valeric aldehyde and was purified before the use by means of distillation over sodium. The solution stirred with magnetic stirrer is brought to boiling and 4.26 g. aluminum di-isobutyl monohydride, prepared by thermal decomposition under a reduced pressure of 5.96 g. (0.0301 mole) aluminum tri-isobutyl, are added dropwise, under slight reflux. The addition lasts 1 hour, however the heating is continued for additional 40 minutes to complete the reaction. At the top of the rectification column are thus collected two fractions of which the first, weighing 0.45 g., is almost exclusively pentene-1 (identifiable through I.R. absorption spectrography) and the second, weighing 0.88 g., contains in addition to the olefin a percentage of the iso-octane solvent. Through quantitative analysis in vapor phase, it is possible to ascertain that the total amount of pentene-1 contained in both fractions reaches 0.52 g. (0.007 mole) so that the yield is 35%.

Example 6

A distillation assembly comprising a 100 cc. flask equipped with drop funnel for introduction of the reactants, a cooler and a collecting test tube with side pipe was used as the equipment.

After having thoroughly washed the equipment with pure nitrogen, 30 cc. anhydrous iso-octane and 7.21 g. (0.0572 mole) 1-ethoxy-1-cyclohexene were introduced, the last showing $n_D^{25}=1.4552$, B.P. 61° C./18 mm. Hg and having been prepared from cyclohexanone diethyl ketal through pyrolysis in the presence of p-toluensulfonic acid. The solution was brought to boiling temperature by means of an oil bath and then the addition was started, dropwise and under magnetic stirring, of aluminum di-isobutyl monohydride obtained from thermal decomposition of tri-isobutyl aluminum. The addition lasted 1½ hours. 16.5 g. (0.116 mole) aluminum di-isobutyl monohydride were introduced. The heating was adjusted, during the addition, so as to have a slow distillation (1–2 drops per minute). The heating was continued, at the end of the addition, until about 31 ml. of liquid were collected in the test tube.

The distillate obtained was subjected to rectification in a column with a Monel spiral, and three fractions were obtained, showing $n_D^{25}=1.4158$, 1.3985 and 1.3901 and B.P. 88–94, 94–99 and 99–99.5° C., respectively. These fractions when analyzed qualitatively and quantitatively by means of vapor chromatography proved to consist almost exclusively of iso-octane and cyclohexene. This latter occurred in the whole of the three fractions for an amount of 1.5 g., with a yield therefore of 32%. The identity of cyclohexene was also confirmed by I.R. spectrography analysis.

Obviously many modifications and variations of the present invention are possible in the light of the above teachings. It is therefore to be understood that within the scope of the appended claims, the invention may be practiced otherwise than as specifically described.

We claim:

1. A process of preparing an olefin hydrocarbon, which comprises reacting an alkenyl ether having the formula:

$$-CH=\overset{|}{C}-O-R'$$

wherein R' is an alkyl radical, with an aluminum compound of the formula:

$$R_2AlR^3$$

wherein R is an alkyl radical and $R^3$ is selected from the group consisting of H and $$\overset{R^1}{\underset{R^2}{\diagdown}}CH-CH_2-$$

wherein $R^1$ and $R^2$ are each selected from the group consisting of H and alkyl radicals.

2. The process of claim 1, wherein the alkenyl ether and the aluminum compound are in equimolecular amounts.

3. A process of preparing an olefin hydrocarbon, which comprises reacting an alkenyl ether having the formula:

$$-CH=\overset{|}{C}-O-R'$$

wherein R' is an alkyl radical, with an aluminum compound of the formula:

$$R_2AlR^3$$

wherein R is an alkyl radical and $R^3$ is selected from the group consisting of H and $$\overset{R^1}{\underset{R^2}{\diagdown}}CH-CH_2-$$

wherein $R^1$ and $R^2$ are each selected from the group consisting of H and alkyl radicals, at a temperature between room temperature and 120° C.

4. A process of preparing ethylene which comprises reacting vinyl isobutyl ether with aluminum tri-isobutyl at a temperature between room temperature and 120° C.

5. A process of preparing ethylene which comprises reacting 2-ethylhexyl vinyl ether with aluminum di-isobutyl monohydride at a temperature between room temperature and 120° C.

6. A process of preparing propylene which comprises reacting ethyl propenyl ether with aluminum di-isobutyl monohydride at a temperature between room temperature and 120° C.

7. A process of preparing pentene-1 which comprises reacting pentenyl ethyl ether with aluminum di-isobutyl monohydride at a temperature between room temperature and 120° C.

8. A process of preparing cyclohexene which comprises reacting 1-ethoxy-1-cyclohexene with aluminum di-isobutyl monohydride at a temperature between room temperature and 120° C.

References Cited by the Examiner

FOREIGN PATENTS 841,236   7/1960   Great Britain.

ALPHONSO D. SULLIVAN, *Primary Examiner.*